United States Patent
Kawabata et al.

(10) Patent No.: US 6,337,548 B2
(45) Date of Patent: Jan. 8, 2002

(54) CONTROL APPARATUS OF BRUSHLESS MOTOR AND MACHINE AND APPARATUS USING BRUSHLESS MOTOR

(75) Inventors: Yukio Kawabata, Hitachinaka; Yasuo Notohara, Hitachioota; Kazuo Tahara, Hitachi, all of (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 09/784,114

(22) Filed: Feb. 16, 2001

Related U.S. Application Data (63) Continuation of application No. 09/273,984, filed on Mar. 22, 1999, now Pat. No. 6,191,545.

(30) Foreign Application Priority Data

Mar. 23, 1998 (JP) .............................. 10-74277

(51) Int. Cl.$^7$ .............................. H02P 6/18; H02P 6/02
(52) U.S. Cl. .................. 318/439; 318/254; 318/138; 318/599
(58) Field of Search ................. 318/138, 245, 318/254, 439, 632, 701, 599; 363/26, 134

(56) References Cited

U.S. PATENT DOCUMENTS

| | | | |
|---|---|---|---|
| 4,950,968 A | * 8/1990 | Ogura | |
| 5,046,123 A | 9/1991 | Horino | |
| 5,374,880 A | 12/1994 | Kondoh et al. | |
| 5,436,547 A | 7/1995 | Nagai et al. | |
| 5,486,743 A | 1/1996 | Nagai | |
| 5,491,393 A | 2/1996 | Uesugi | |
| 5,689,162 A | 11/1997 | Li | |
| 5,694,010 A | * 12/1997 | Oomura et al. | |
| 5,821,713 A | 10/1998 | Holling et al. | |
| 5,859,510 A | 1/1999 | Dolan et al. | |
| 5,886,454 A | 3/1999 | Fucili et al. | |
| 5,886,486 A | * 3/1999 | Jeong et al. | |
| 5,929,577 A | 7/1999 | Neidorff et al. | |
| 5,949,204 A | * 9/1999 | Huggett et al. | |
| 5,970,733 A | 10/1999 | Hamaoka et al. | |
| 6,005,364 A | * 12/1999 | Acarnley | |
| 6,014,004 A | 1/2000 | Hamaoka et al. | |
| 6,041,625 A | 3/2000 | Nagai et al. | |

FOREIGN PATENT DOCUMENTS

| | | | |
|---|---|---|---|
| EP | 0 267 283 A1 | | 5/1988 |
| JP | 5-227785 | * | 9/1993 |
| JP | 7-147793 | | 6/1995 |
| JP | 7-255194 | | 10/1995 |
| JP | 7-264891 | * | 10/1995 |
| JP | 8-223974 | | 8/1996 |
| JP | 9-182484 | * | 7/1997 |
| JP | 9-312993 | | 12/1997 |
| JP | 10-108491 | * | 4/1998 |
| JP | 10-243684 | * | 9/1998 |

* cited by examiner

*Primary Examiner*—Paul Ip
(74) *Attorney, Agent, or Firm*—Antonelli, Terry, Stout & Kraus, LLP (57) ABSTRACT

An apparatus such as an air conditioner, refrigerator or washing machine having a control apparatus for use in a brushless motor facing a part of a compressor and/or blower of the apparatus. The control apparatus includes a voltage detector for generating a detection voltage in response to a terminal voltage of plural phases of a stator winding of the brushless motor, a standard voltage generator for generating a standard voltage, a comparator for outputting a comparison result information signal by comparing the detection voltage and said standard voltage, a controller for detecting a rotation position of a rotor of the brushless motor according to the comparison result information signal which is outputted from the comparator and for outputting an electric supply control signal, and an output unit for supplying electric power to the stator winding according to the electric supply control signal.

14 Claims, 7 Drawing Sheets

(a) DETECTION SIGNAL 8a (b) COMPARISON RESULT INFORMATION SIGNAL 10a,10b (c) GATE SIGNAL 13a (d) PHASE SIGNAL 9a

FIG. 7

(a) DETECTION SIGNAL 8a (b) PWM SIGNAL (c) COMPARISON RESULT INFORMATION SIGNAL 10a,10b (d) POSITION DETECTION INFORMATION IN CONTROL CIRCUIT IN INTERIOR PORTION

CONTROL APPARATUS OF BRUSHLESS MOTOR AND MACHINE AND APPARATUS USING BRUSHLESS MOTOR

CROSS REFERENCE TO RELATED APPLICATION

This is a continuation of U.S. application Ser. No. 09/273,984, filed Mar. 22 1999 now U.S. Pat. No. 6,191,545, the subject matter of which is incorporated by reference herein.

BACKGROUND OF THE INVENTION

The present invention relates to a control apparatus for a brushless motor and to a machine and apparatus using a brushless motor. The invention relates in particular to a control apparatus for controlling the speed of rotation of a brushless motor to a desired speed. This control apparatus may be used in an air conditioner for performing air conditioning in a room by controlling a brushless motor for driving a compressor and a blower in the air conditioner, a refrigerator for carrying out refrigeration by controlling a brushless motor for driving a compressor and a blower in the refrigerator, and a washing machine for carrying out the washing of clothes by controlling a brushless motor for driving an agitator and a spinning basket in the washing machine.

A brushless motor in which a permanent magnet rotor and a stator winding are combined typically is employed in an air conditioner, a refrigerator and a washing machine, etc. from an aspect of ease of maintenance.

In a drive control of the above stated brushless motor, it is necessary to carry out control in close relationship with the magnetic pole position of the rotor and the position of the stator winding to which electric power is suppled. To detect the magnetic pole position of the rotor, without use of a rotor position detection sensor, such as a Hall element etc, a sensorless position detection system is employed using a counter electromotive voltage, which is induced in the stator winding according to a mutual operation with the magnetic pole of the rotor, allowing the magnetic pole position of the rotor to be detected.

As a brushless drive apparatus in which the above stated rotor position detection system is employed, for example, there is a brushless motor drive apparatus described in Japanese application patent laid-open publication No. Hei 7-147793. In this brushless motor drive apparatus, a direct current voltage, which is outputted from a direct current power supply, is supplied to a stator winding of a brushless motor through an inverter circuit. A terminal voltage detection means produces a detection voltage by voltage dividing the terminal voltage of the stator winding of the brushless motor, and the detection voltage is inputted to a comparison circuit. The comparison circuit outputs a phase signal by comparing the detection voltage with a standard voltage.

And, on the basis of a pulse width modulation (PWM) signal PS generated from a pulse width modulation (PWM) signal generation circuit, a control apparatus generates a latch timing signal LS according to a latch signal generation circuit to perform a latch operation after a timing in which the above stated PWM signal PS changes from an "on" condition to an "off" condition. Even when an oscillation is generated in the terminal voltage of the stator winding, without being affected by such oscillation, the phase signal from the comparison circuit is latched in a latch circuit and the position detection signal can be obtained.

SUMMARY OF THE INVENTION

In the above stated conventional brushless motor drive apparatus, an output signal from the latch circuit is delayed with time from the phase signal which is outputted from the comparison circuit and, accordingly, the detection position of the rotor magnetic pole which is obtained becomes displaced widely from the actual position of the magnetic pole of the rotor.

As stated above, when the detection timing of the position detection signal deviates widely, the commutation (electric supply) phase of the stator winding current of the brushless motor is delayed, resulting in an increase in current delays, and the current rises up immediately prior to a change-over of the winding current. This places an increased burden on the drive circuit due to a lowering of the operating efficiency and a sharp rise-up by the current, with a result that an increase of the current capacity of the circuit elements is necessary, which results in an increase in the manufacturing cost. Or, during the latch timing, the noises overlap with the output signal of the comparison circuit due to the disturbance noises, and, when a phase signal which deviates widely in position from an original position detection signal is latched, the brushless motor can not be driven normally, resulting in a problem in which the brushless motor vibrates or stops.

Further, in the above stated conventional brushless motor drive apparatus, since the latch operation is carried out after the timing in which the PWM signal PS changes from the "on" condition to the "off" condition, when the conduction ratio during PWM control is 100%, there is an problem in that a gate signal of the latch circuit can not be defined or the gate signal in the conduction ratio at 100% of PWM control etc. can not be defined.

An object of the present invention is to provide a control apparatus for a brushless motor wherein the magnetic pole position detection accuracy of a rotor in the brushless motor can be heightened and an accurate control can be carried out.

Another object of the present invention is to provide a control apparatus for a brushless motor wherein the position detection error due to noises can be reduced.

A further object of the present invention is to provide a control apparatus for a brushless motor wherein an electric supply error operation due to noises can be reduced.

A still further object of the present invention is to provide a control apparatus for a brushless motor wherein the control range can be enlarged.

A further object of the present invention is to provide a control apparatus for a brushless motor wherein the operation of a brushless motor can be controlled by an efficiency importance characteristic or can be controlled by a high speed importance characteristic.

Yet another object of the present invention is to provide a control apparatus for a brushless motor wherein a wide control range can be attained.

Still another object of the present invention is to provide a control apparatus for a brushless motor wherein, when the period of return flow current after an electric supply change-over is very long without stopping the brushless motor, a good control can be carried out.

A further object of the present invention is to provide a machine and apparatus, in which a brushless motor controlled as stated above becomes a power source, in particular, for an apparatus such as an air conditioner, a refrigerator, or a washing machine.

One feature according to the present invention resides in the fact that in a control apparatus for use in a brushless motor in which, by detecting a position of a magnetic pole of a rotor according to a terminal voltage of a stator winding of a respective phase, an electric supply to the stator winding is controlled, and an "on" period and an "off" period of the PWM signal is extracted in accordance with a comparison result information signal in which a detection voltage in response to the terminal voltage is compared with a standard voltage.

Another feature according to the present invention resides in the fact that, during the "on" period of the PWM signal, extracted according to the terminal voltage of the stator winding, the above stated comparison result information signal, which is output as a phase signal as it is during the "off" period by holding an immediately prior comparison result information signal, is output as a phase signal.

Another feature according to the present invention resides in the fact that the position of the rotor is detected in accordance with a pattern of the comparison result information signal of the stator winding of plural phases.

A further feature according to the present invention resides in the fact that an electric supply pattern to the stator winding is determined in accordance with a pattern of the comparison result information signal of the stator winding of plural phases.

Another feature according to the present invention resides in the fact that the period in which a return flow current flows after an electric supply change-over is detected in accordance with a pattern of the comparison result information signal of the stator winding of plural phases.

Still another feature according to the present invention resides in the fact that after the vanishing of a return flow current after an electric supply change-over, a processing for renewing a phase signal pattern for a correlation for position detection is carried out.

Another feature according to the present invention resides in the fact that after an electric supply change-over and a predetermined time lapse, a processing for renewing a phase signal pattern for a correlation for position detection is carried out.

Another feature according to the present invention resides in the fact that a rotor position is detected, in accordance with a pattern of the comparison result information signal and according to electric supply phase information stored in a memory or a phase control command from an outside source, and a change-over of an electric supply phase is carried out.

Another feature according to the present invention resides in the fact that in a PWM control area, a phase control having an operation efficiency importance is carried out and in a high rotation importance area a control for proceeding an electric supply phase is carried out.

A further feature according to the present invention resides in the fact that, in an air conditioner, a refrigerator and a washing machine, the brushless motor controlled by the above stated control apparatus is used as a driving source.

DESCRIPTION OF THE INVENTION

Hereinafter, the embodiments of a control apparatus for use in a brushless motor, and a machine and apparatus using the brushless motor, which is driven and controlled by the control apparatus, will be explained with reference to from FIG. 1 to FIG. 9.

Figure 1:
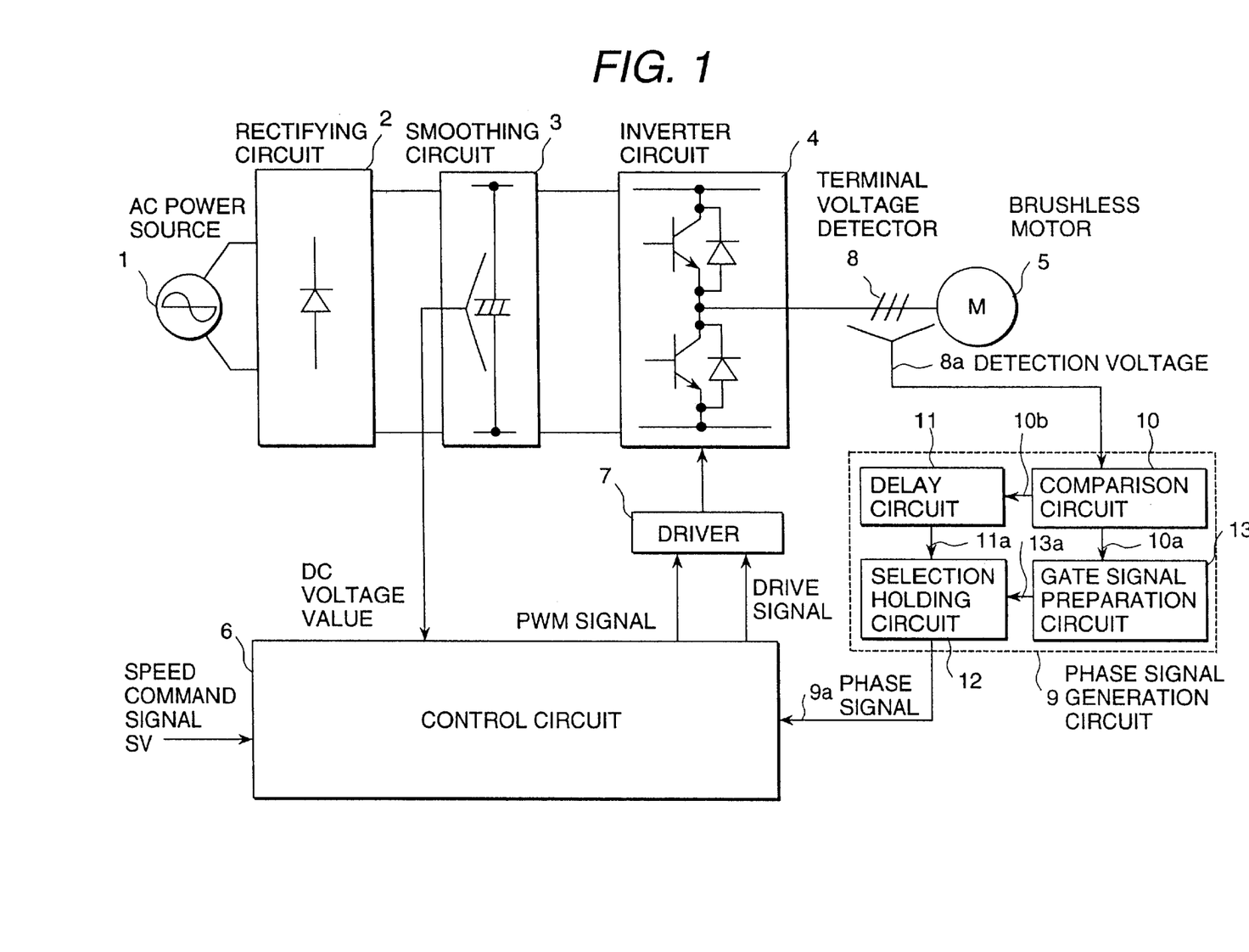
FIG. 1 is a block diagram showing a brushless motor drive apparatus representing one embodiment according to the present invention.

FIG. 1 is a block diagram showing a brushless motor drive apparatus representing one embodiment according to the present invention. This brushless motor drive apparatus comprises an alternating current (AC) power supply 1, a rectifying circuit 2, a smoothing circuit 3, an inverter circuit 4, a brushless motor 5, a control circuit 6, a driver 7, a terminal voltage detector 8, and a phase signal generation circuit 9.

The rectifying circuit 2 rectifies an alternating current (AC) from the alternating current (AC) power supply 1, and the smoothing circuit 3 smooths the rectified output voltage and generates a direct current (DC) voltage. The inverter circuit 4 converts the direct current (DC) voltage to an alternating current (AC) voltage having an optimum pulse width and supplies it to a stator winding of the brushless motor 5, and then the brushless motor 5 is rotated. The control circuit 6 (one chip microprocessor or a hybrid IC) carries out a control processing for control of the above stated brushless motor 5 in response to a speed command signal SV, and the driver 7 drives the inverter circuit 4 in accordance with the output of the control circuit 6.

In accordance with a detection voltage 8a, which is obtained from the terminal voltage detector 8 in response to a terminal voltage (=a counter electromotive force) of a respective phase of the stator winding of the brushless motor 5, the phase signal generation circuit 9 generates a phase signal 9a which represents information as to the position of a magnetic pole of the rotor of the brushless motor 5 and supplies this phase signal 9a to the control circuit 6.

The phase signal generation circuit 9, basically, is a circuit in which, when a PWM signal is in an "on" condition, a comparison result information signal lob from a comparison circuit 10, which is responsive to the detection voltage 8a corresponding to the terminal voltage of the respective phase of the brushless motor 5, is outputted as the phase signal 9a, and when PWM signal changes to the "off" condition, the previous level of the comparison result information signal lob is held and output as the phase signal 9a.

The phase signal generation circuit 9 comprises the comparison circuit 10 for comparing the detection voltage 8a, which corresponds to the terminal voltage of a respective phase of the stator winding of the brushless motor 5, with a standard voltage; a delay circuit 11 for delaying the comparison result information signal 10b of the respective phase which is outputted from the comparison circuit 10; a selection holding circuit 12 for outputting the generated phase signal 9a, according to an output signal 11a from the delay circuit 11, to the above stated control circuit 6; and a gate signal preparation circuit 13 for producing a gate signal 13a for controlling the operation characteristic of the selection holding circuit 12 in accordance with the comparison result information signal 10a which is outputted from the above stated comparison circuit 10.

The above stated comparison circuit 10 is a circuit in which the detection voltage 8a, in response to the terminal voltage of a respective phase of the stator winding of the brushless motor 5, is compared with a standard voltage, and the comparison result information signals 10a and 10b are output for each of the respective phases. Herein, the standard voltage used in the comparison is a voltage of ½ of a neutral point voltage of the stator winding of the brushless motor 5 or the direct current (DC) voltage which is outputted from the smoothing circuit 3.

The gate signal preparation circuit 13 extracts an "on" period or an "off" period of the PWM control according to a logical processing in accordance with the comparison result information signal 10a which is outputted from the comparison circuit 10. And, for control of the selection holding circuit 12, the gate signal preparation circuit 13 has a function of outputting the gate signal 13a for selecting whether a phase signal 9a reflecting the level of the comparison result information signal 10b at this time is to be outputted, or whether the signal level which appears before the PWM signal changes to the "off" condition is to be held as the phase signal 9a to be outputted. When the voltage level of the detection voltage 8a is at a level in which a general logic circuit is processed, the gate signal 13a can be obtained directly from this detection voltage 8a.

The above stated delay circuit 11 is a functional means for delaying the comparison result information signal 10b of the respective phase which is outputted from the comparison circuit 10 to adjust the operation timing when the signal is selected and held in the selection holding circuit 12. Since this delay circuit 11 adjusts the timing of the signal 11a which is inputted to the selection holding circuit 12 and the operation (the gate signal 13a) of the selection holding circuit 12, and taking into consideration the circuit constant of the comparison circuit 10 and the gate signal preparation circuit 13, it is possible to omit the delay circuit 11 by adjusting the comparison result information signal 10b and the gate signal 13a.

According to the gate signal 13a, which is output from the gate signal preparation circuit 13, the selection holding circuit 12 functionally operates to output the respective output signal 11a from the delay circuit 11 as the respective phase signal 9a as it is, when the gate signal 13a is high, and, when the gate signal 13a is low, operates to output as the phase signal 9a the same signal level as was output before the gate signal 13a went low.

Figure 2A:
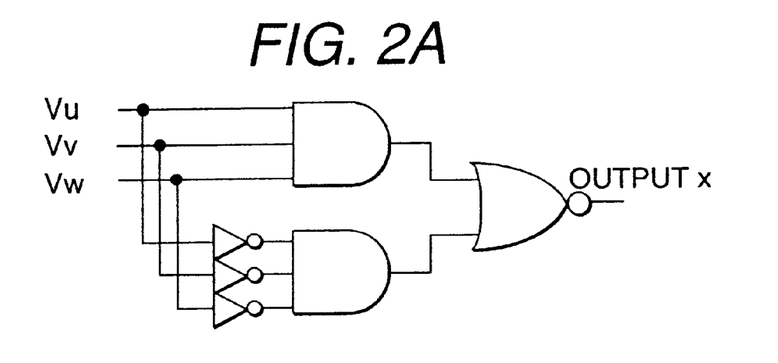
FIG. 2A is a schematic circuit diagram showing a gate signal preparation circuit in the brushless motor drive apparatus according to the present invention, as shown in FIG. 1.
Figure 2B:
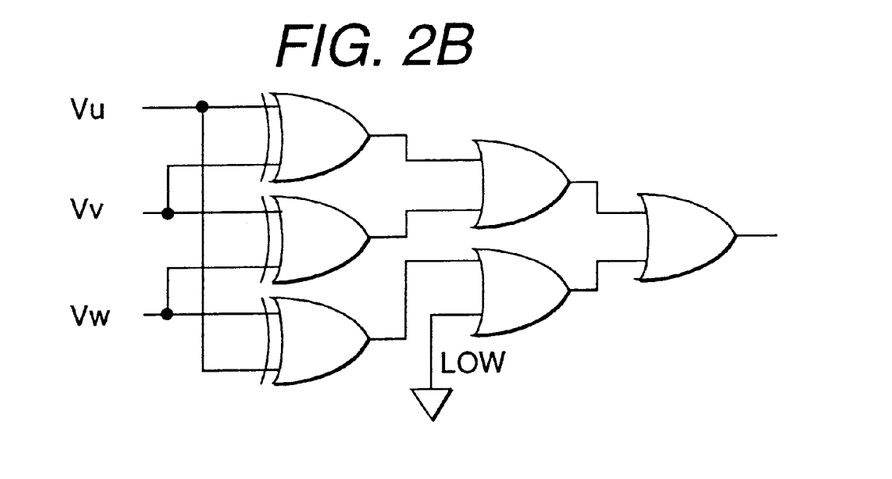
FIG. 2B is a schematic circuit diagram showing a gate signal preparation circuit in the brushless motor drive apparatus according to the present invention, as shown in FIG. 1.
Figure 2C:
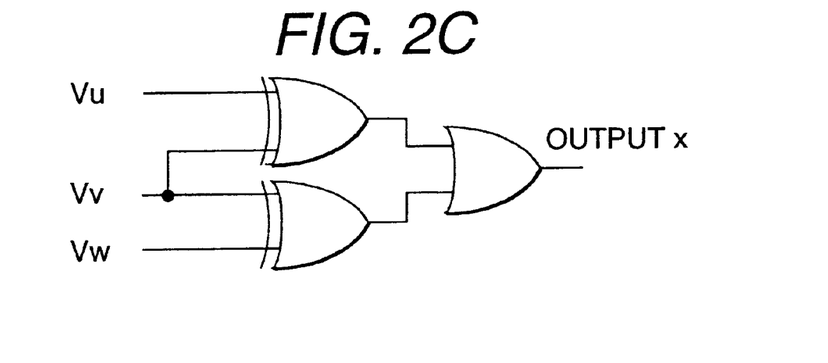
FIG. 2C is a schematic circuit diagram showing a gate signal preparation circuit in the brushless motor drive apparatus according to the present invention, as shown in FIG. 1

Each of FIG. 2A, FIG. 2B and FIG. 2C is a block diagram showing a respective example of the above stated gate signal preparation circuit 13. The illustrated gate signal preparation circuit 13 is constituted by a combination of logic elements. The comparison result information signal 10a is inputted as Vu, Vv and Vw, and the logic processing result (an output X) of the logic formula (formula 1) is outputted as the gate signal 13a. Accordingly, when the logic circuit satisfies the formula 1, even if it has another construction, it can be used similarly.

$$\text{output } X = (Vu \times Vv \times Vw) + (Vu \times Vv \times Vw) \qquad \text{formula 1}$$

Figure 3:
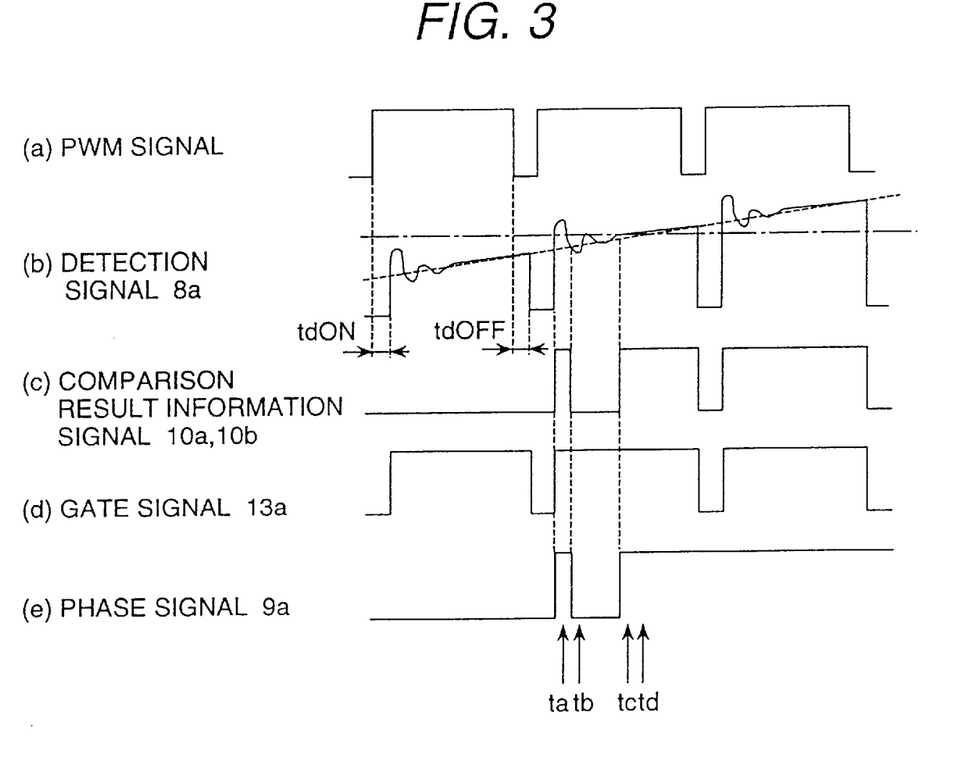
FIG. 3 is a signal waveform diagram relating to a position detection circuit in the brushless motor drive apparatus according to the present invention, as shown in FIG. 1.

FIG. 3 shows the waveform of signals in the control circuit 6 and the phase signal generation circuit 9. In FIG. 3, waveform (a) shows the PWM signal which is outputted from the control circuit 6. In relation to this, waveform (b) of FIG. 3 is a detection voltage waveform of the terminal voltage of the stator winding of the brushless motor 5 showing an affect of the driver 7 and the inverter circuit 4 at a respective raise-up of the waveform after a delay of tdON and at a respective falling-down of the waveform at a delay of tdOFF. Waveform (c) of FIG. 3 shows the comparison result information signals 10a and 10b which are outputted from the comparison circuit 10. Waveform (d) of FIG. 3 is the gate signal 13a which is produced by the gate signal preparation circuit 13 in response to the comparison result information signal 10a.

In the selection holding circuit 12, as shown in waveform (e) of FIG. 3, in response to the gate signal 13a, when the gate signal 13a is at a high level, the output signal 11a of the delay circuit 11 is selected, and when the gate signal 13a is at a low level, the phase signal 9a retains the signal level which it had immediately before the signal 13a went low.

Figure 4:
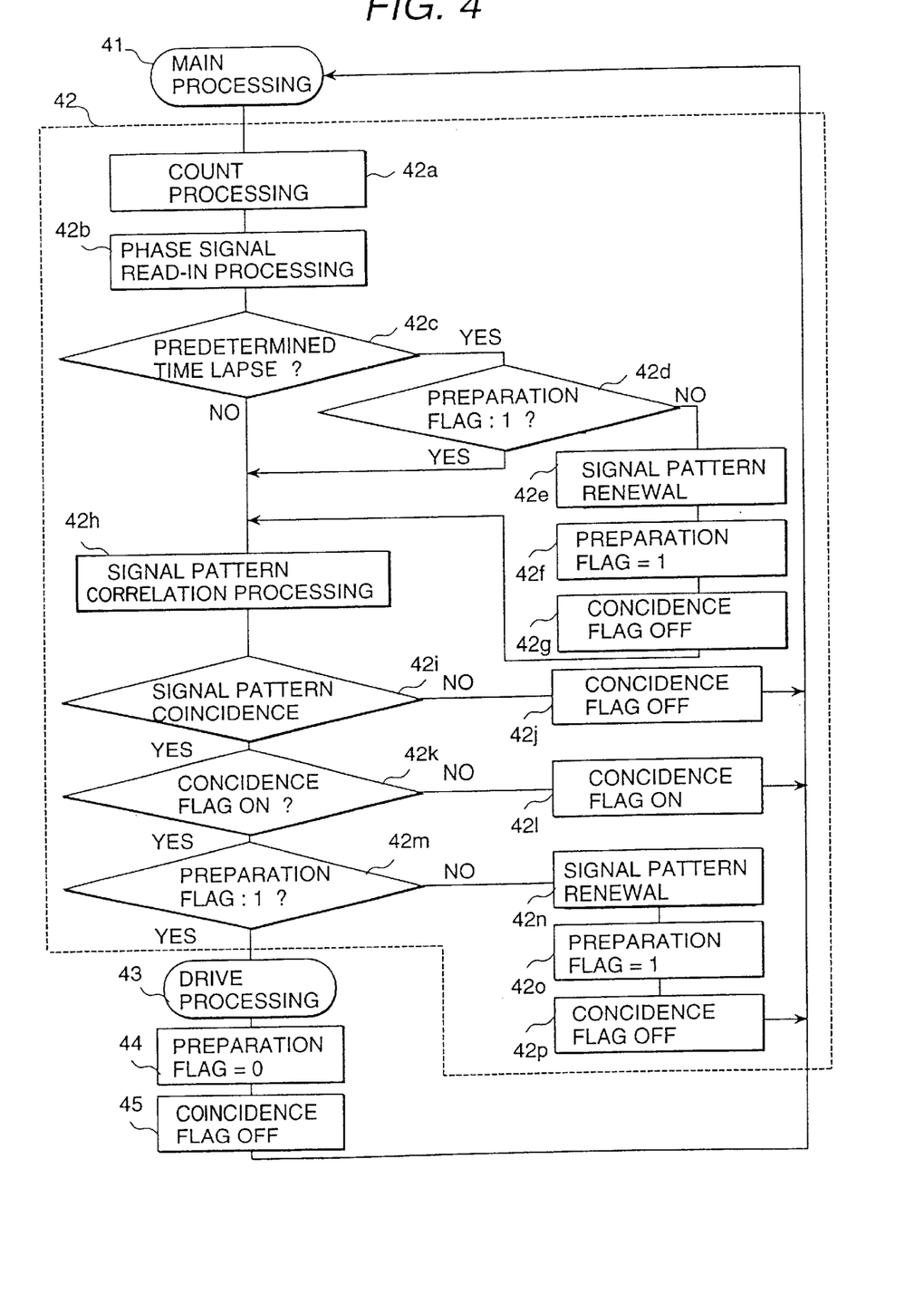
FIG. 4 is a processing flow chart showing the operation of a control circuit in the brushless motor drive apparatus according to the present invention, as shown in FIG. 1.

FIG. 4 shows one example of the processing performed by the control circuit 6 in response to the phase signal 9a. A processing 41 is a main processing for motor control, including a speed control etc. of the brushless motor 5. A processing 42 is a signal processing with respect to rotor position detection, and a processing 43 is a drive processing for determining a switching operation of the inverter circuit 4 according to the rotor position, which is determined by the processing 42. A processing 44 is a processing for clearing a preparation flag relating to the drive processing on the basis of the position detection processing; and a processing 45 is a processing for clearing a coincidence flag which indicates two occurrences of a coincidence detection of a phase signal pattern. Herein, the drive processing performed by the processing 43 is a processing which occurs after a predetermined time lapse, which is adjusted by the phase correction to enable the electric supply change-over.

The processing 42 is a processing in which, by periodically reading the phase signal 9a, and on the basis this phase single 9a, the rotor position is detected (determined). In the detection of the position of this rotor, since the phase signal 9a presents a predetermined signal pattern, a pattern of the phase signal 9a is detected by correlation with a predetermined signal pattern.

A processing step 42a is a count processing step to manage the signal processing relating to the rotor position detection of how times a processing is carried out during the electric angle of 30 degrees, during the electric angle of 60 degrees, during the electric angle 120 degrees, during the electric angle of 360 degrees, and during the mechanical angle of 360 degrees, etc. Further, the processing 42a is a count processing which is carried out after the lapse of a predetermined time.

A processing step 42b is a read-in processing step for reading in the phase signal 9a of the respective phase. At this time, in accordance with the timing at which the phase signal 9a has been read in, the level of the signal, such as the high level or the low level, from the control circuit 6 is effective to confirm the operation of the control apparatus.

A processing step 42c is a processing step in which, after the electric supply change-over, it is determined whether a predetermined time has lapsed or not, which judgment is obtained according to a count value produced by an interior timer or the above stated processing 42a, etc.

A processing step 42d is a branch processing in which it is determined whether a predetermined signal pattern necessary for the next electric supply control processing is set or not.

A processing step 42e is a processing step for renewal and setting of the predetermined signal pattern necessary for the next electric supply processing, when, in the above stated processing step 42d, it is determined that a predetermined signal pattern necessary for the next electric supply processing is not set. The processing step 42e involves setting a preparation flag in which the renewal of the predetermined signal pattern is expressed. A processing step 42f involves a processing for clearing the flag which is used for the judgment in which it is determined whether or not the position signal pattern occurs for a first time.

In a processing step 42h, the pattern of the respective phase signal 9a, which is read in at the processing step 42b, is correlated with a predetermined signal pattern which is determined by the rotor position.

In a processing step 42i, when the signal patterns are coincident, the processing proceeds to the processing step 42k, but when the signal patterns are not coincident, the processing jumps to the processing step 42j.

The processing step 42j carries out a processing in which the flag, which is used to indicate whether coincidence has occurred two times or not, is cleared.

The processing step 42k is a branch processing in which it is determined whether coincidence has occurred two times or not. A processing step 42l is a processing in which, when the coincident flag is in the "off" condition and the signal pattern is coincident, then the coincident flag is set to the "on" condition. A processing step 42m is a branch processing in which it is determined whether the predetermined signal pattern necessary for the next electric supply control processing is set or not.

A processing step 42n involves a processing in which the predetermined signal pattern necessary for the next electric supply control processing is renewed and set, when, in the above stated processing step 42m, it is judged that the predetermined signal pattern necessary for the next time electric supply control processing is not set. A processing step 42o involves a processing in which a preparation flag for indicating the renewal of the predetermined signal pattern is set, and a processing step 42p involves a processing for clearing the flag which is used when it is judged whether the coincident signal pattern occurs for the first time or not. In other words, after the predetermined signal pattern is renewed in the processing step 42e or the processing step 42n, when the signal pattern of the phase signal 9a which is read in the processing step 42b has produced coincidence two times, at this rotation position a suitable electric supply pattern is determined, and then the drive processing 43 is carried out.

Herein, since the steps from the processing step 42d to the processing step 42g are of the same rank as the steps from the processing step 42n to the processing step 42p, by forming a sub-routine, an increase in program complexity can be restrained to a minimum, and, at the same time, when the return flow period after the electric supply changeover is long, the brushless motor 5 can be controlled effectively.

Figure 5:
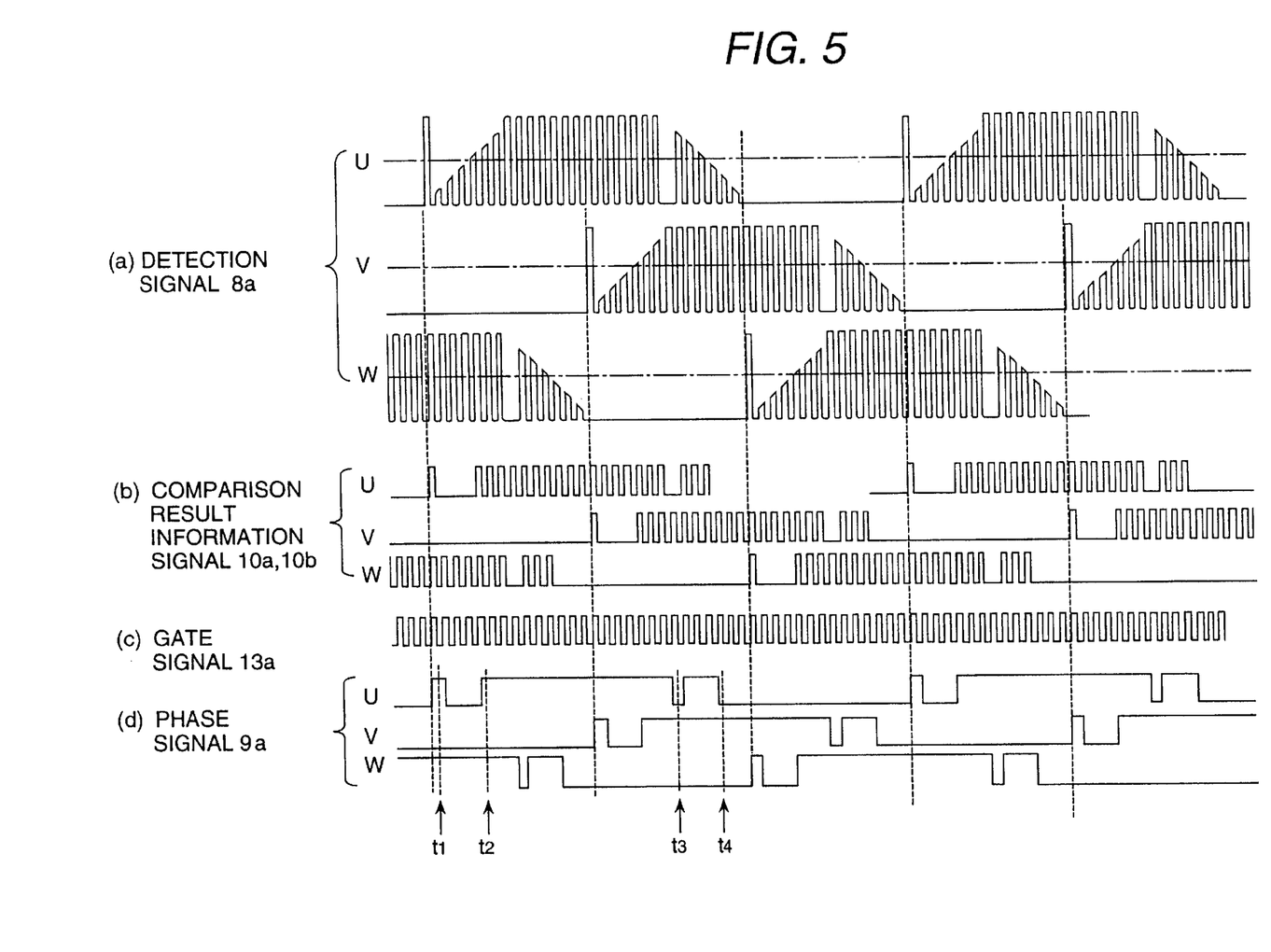
FIG. 5 is a signal waveform diagram in PWM (pulse width modulation) control having a conduction ratio less than 100% relating to the position detection circuit in the brushless motor drive apparatus according to the present invention, as shown in FIG. 1.

FIG. 5 shows the detection signal 8a indicative of the terminal voltage of the respective phase (U, V, W phase) of the stator winding, the PWM signal, the comparison result information signal of the respective phase which is outputted from the comparison circuit, the information signal pattern of the PWM signal during the "on" condition, which is read in the control circuit 6, and the position detection information which is recognized in the interior portion of the control circuit 6 for the brushless motor 5 in PWM control with a conduction ratio of less than 100%.

Referring to FIG. 5, in a case where the control processing using the algorithm shown in FIG. 4 is carried out, as shown at t1 and t3, immediately after the change-over of the electric supply pattern, when the phase signal which is equal to t2 and t4 appears, error judgment can be prevented, and also, without the affect of the return flow current which flows immediately after the change-over of the electric supply pattern, a good phase signal can be obtained effectively, with the result that the change-over of the electric supply can be carried out effectively.

Further, in the processing step 42e and the processing step 42n, as explained with reference to FIG. 4, after the renewal of the signal pattern, as shown in waveform (b) of FIG. 3, when the detection signal oscillates at the vicinity of the standard point, the signal response to the oscillation is outputted, as shown in waveform (c) of FIG. 3. From the processing 41, the processing transfers to the periodic processing 42, and the processing step 42b is carried out with the timing ta shown in waveform (e) of FIG. 3. The correlation of the signal patterns is carried out in the processing step 42h, and, according to the pattern coincidence in the processing step 42i, the processing proceeds to the processing step 42k. At this time, during the present electric supply period, since there is a first time pattern coincidence and the coincidence flag is in the "off" condition, the processing branches from the processing 42k to the processing step 42l. After that, the processing step 42b is carried out again with the timing tb shown in waveform (e) of FIG. 3, and after the processing step 42h is carried out, in the processing step 42i, since the signal pattern does not coincide, the processing branches to the processing step 42j, and the coincidence flag is cleared. The processing then returns to main processing 41.

Further, when the processing transfers from the above stated processing 41 to the periodic processing 42, the processing step 42b is carried out at the timing of tc shown in waveform (e) of FIG. 3, similar to the above, as far as the processing step 42l is carried out. At the timing td shown in waveform (e) of FIG. 3, the processing from the processing step 42b to the processing step 42k is carried out since the coincidence flag is in the "on" condition. The processing proceeds through the processing 42m to the processing 43, and, as a result, the drive processing suited for the rotor position is carried out.

When the phase signal generation circuit 9 and the above stated position detection algorithm are employed, even when pulse shape noises are generated, the rotor position can be detected properly, and, as a result, it is possible to carry out good motor control. Further, in this embodiment according to the present invention, as a condition for carrying out drive processing, two occurrences of pattern coincidence of the phase signal 9a are employed, however, it is effective to employ detection of coincidence more than two times, and also it is effective to omit this requirement by restraining the noises and the oscillations which appear in the terminal voltage of the stator winding of the brushless motor 5.

Figure 6:
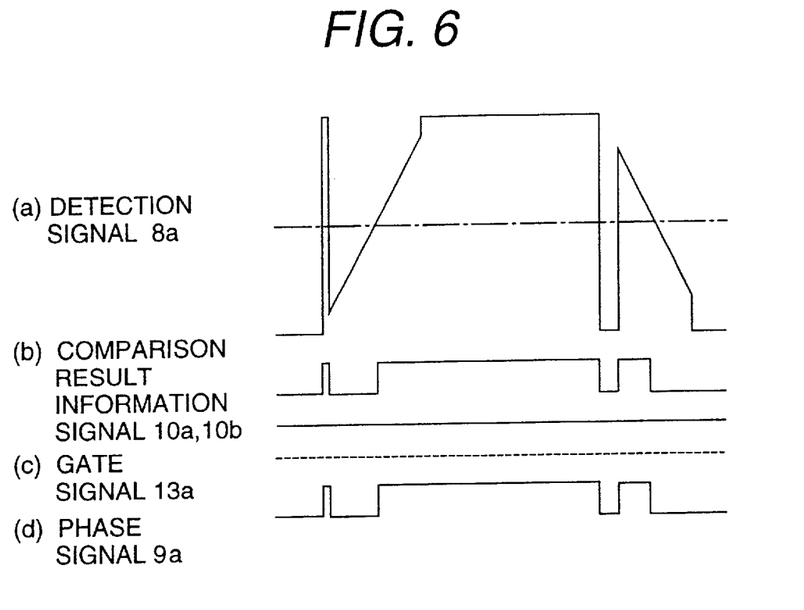
FIG. 6 is a signal waveform diagram in PWM control having a conduction ratio of 100% and PAM (pulse amplitude modulation) control relating to the position detection circuit in the brushless motor drive apparatus according to the present invention, as shown in FIG. 1.

FIG. 6 shows a part of one phase of the detection voltage 8a of the terminal voltage of the stator winding of the brushless motor 5, the comparison result information signals 10a and 10b which are outputted from the comparison circuit 10, the gate signal 13a which is outputted from the gate signal preparation circuit 13 and the phase signal 9a which is outputted from the selection holding circuit 12, in PWM control with a conduction ratio of 100% or in PAM (Pulse Amplitude Modulation) control.

In a case where this phase signal generation circuit 9 is employed, when the PWM signal is in the "on" condition, the comparison result information signal 10b is reflected to the phase signal 9a as it is, and when the PWM signal is in the "off" condition, the signal level which occurs immediately before the "off" condition is held, so that regardless of whether the chopping operation in the PWM control is carried out or not, a similar phase signal 9a can be obtained, with the result that it is possible to carry out a good motor control in PAM control.

Further, in this embodiment according to the present invention, even with a construction in which an output voltage variable type rectifying circuit 2 is employed, since the standard voltage of the comparison circuit 10 is varied in response to the present output voltage, PWM control and PAM control, or the change-over control of PWM/PAM, an equal phase signal can be obtained and good motor control can be realized.

Figure 7:
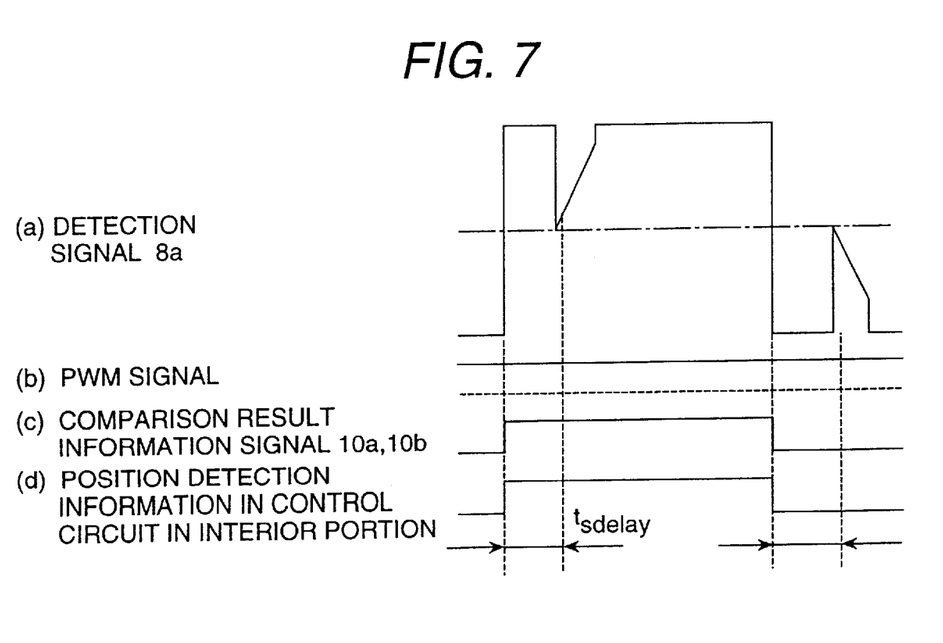
FIG. 7 is a signal waveform diagram for a long period in which a return flow current flows after an electric supply current change-over according to the present invention.

FIG. 7 shows the detection voltage 8a of the terminal voltage of the stator winding of the brushless motor 5, the comparison result information signal which is outputted from the comparison circuit, and part of one phase of the position detection information in the interior portion of the control circuit 6, in PWM control with a conduction ratio of 100% or PAM control, when the period in which return flow current flows after the electric supply change-over is long.

Since the processing step 42e is provided to judge the predetermined time lapse after the electric supply change-over, when the period in which the return flow current flows after the electric supply change-over is long and the information signal does not vary in the vicinity of the standard point, as shown in FIG. 6, the signal pattern is altered. Accordingly, the brushless motor 5 does not stop and good motor control can be obtained.

And, when the phase signal generation circuit 9 as described above is used, since the "on" period and the "off" period of the PWM signal are extracted from the voltage (the terminal voltage) which is applied actually to the stator winding of the brushless motor 5, it is unnecessary to carry out an operation for timing adjustment and correction from the outside and, even when the circuit constant etc. for determining the delay time varies, it is possible to generate a phase signal for carrying out a superior rotation position detection processing.

Incidentally, between the PWM signal which is generated in the control circuit 6 and the voltage which is applied actually to the stator winding of the brushless motor 5, since a delay occurs due to operation delay, when in the control circuit 6 the rotor position can be detected accurately from the motor terminal voltage in response to the PWM signal, it is necessary to carry out a timing adjustment between them.

As the control circuit 6 detects (judges) the rotor position in accordance with the pattern of the phase signal in response to the terminal voltage (the detection voltage) of the stator winding of the respective phase of the stator winding at some time (timing), erroneous detection due to the noises can be reduced.

Further, in this control circuit 6, since the next electric supply pattern is determined according to this rotor position and the present electric supply pattern according to the stator winding, it is possible to reduce erroneous operation due to the noises.

In the rotation position detected according to the edge interruption processing used in the conventional control apparatus, to avoid erroneous operation due to a spike voltage which is generated immediately after the commutation, it is necessary to provide a phase signal read-on inhibiting section. However, according to the present invention, it is unnecessary to provide such a phase signal read-on inhibiting section, since, by measuring the period of the spike voltage, the time (the timing for vanishing the return flow current) in which the return flow voltage flows can be assumed, and by utilizing this to achieve phase control, wide control can be realized.

Figure 8:
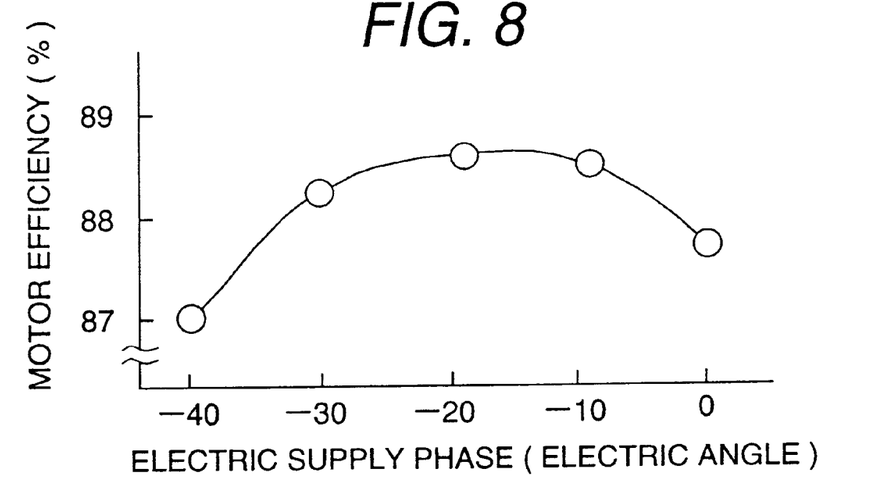
FIG. 8 is an operation efficiency characteristic diagram for the brushless motor according to the present invention.

Since the operation efficiency of the brushless motor 5, as shown in FIG. 8, changes according to the electric supply phase to the counter electromotive force, the electric supply phase is a very important factor. Accordingly, to effect the highest efficiency during motor starting, using the information which is stored in a RAM and ROM in advance, the electric supply phase is controlled, with the result that the brushless motor 5 can be operated with the high efficiency.

Further, when the electric supply phase is controlled from the outside at the user side, the brushless motor 5 can be operated by an electric supply phase which is suited for the motor. The control terminals for the outside control can use an A/D conversion terminal, a communication use terminal and an input port etc.

Figure 9:
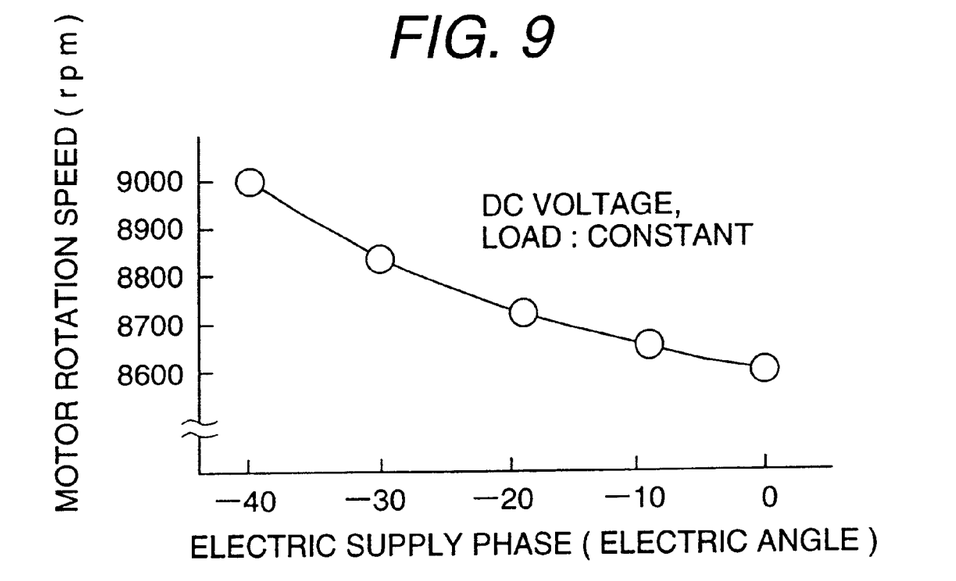
FIG. 9 is a speed characteristic diagram for the brushless motor according to the present invention.

In the speed control in the brushless motor 5, in PWM control in which the terminal voltage which is supplied to the stator winding is controlled by pulse width control, when the conduction ratio reaches the maximum value (100%), it can not carry out control for heightening the rotation speed more than the maximum value. Further, in PAM control for carrying out speed control by controlling the magnitude of the terminal voltage which is supplied to the stator winding, when the terminal voltage reaches the maximum value, it can not carry out the control for increasing the rotation speed beyond the maximum value. However, as shown in FIG. 9, at a condition in which, by maintaining the terminal voltage at the same value which is supplied to the stator winding, the electric supply phase is varied, and, accordingly, the rotation speed can be varied. And, the control of the electric supply phase can be realized by employing the phase signal.

Accordingly, in addition to PWM control of the stator winding current of the brushless motor and/or PAM control, the electric supply phase is carried out, and the rotation speed of the brushless motor can be controlled widely. For example, in PWM control, under the condition where the conduction ratio does not reach the maximum value, or under the condition where in PAM control the supply voltage does not reach the maximum value, the control under the electric supply phase in which the efficiency of the motor becomes maximum and after the conduction ratio or the supply voltage has reached maximum value, the control is carried out to proceed the electric supply phase from the maximum efficiency point, and in common it carries out the operation control characteristic as the efficiency importance. Under the condition where the high rotation is necessary, it can proceed the electric supply phase and the operation control characteristic having the high speed characteristic importance.

In the above stated control apparatus, this control apparatus is constituted by a hybrid IC to which the control circuit 6 and the phase signal generation circuit 9 are united and an intelligent type power module to which the control circuit 6 and the phase signal generation circuit 9 are united, the number of components can be reduced. As a result, a control apparatus which is able to be handled easily can be obtained.

In a heat pump system for an air conditioner, since the cooling and warming output is varied by the rotation speed of a compressor, as stated above, in addition to PWM control and/or PAM control, by using a brushless motor which is controlled under the electric supply phase as the drive source of the above stated compressor and/or the blower, an air conditioner having a high cooling and warming ability can be realized. Further, in the ordinary operation area, an operation control having efficiency importance is carried out. With the result that an energy saving type air conditioner can be attained.

Similarly to above, since the brushless motor controlled by using this control apparatus is used as the drive source of the compressor and/or the blower of a refrigerator, a refrigerator having a superior refrigeration ability can be realized.

Further, when in a washing machine, the brushless motor for rotating the agitator and the spinning basket is constituted as the power source and is controlled using this control apparatus, similar to the washing machine, a superior control characteristic can be obtained. In particular, it is effective to realize an energy saving and high speed spinning.

In addition to the above, when the phase signal generation circuit according to the present invention is employed, since the use of the electrolyte capacitor having the large capacity becomes unnecessary, and since the apparatus has the function for holding the signal level, even a low cost microprocessor having the slow processing speed can be used in the control apparatus, making it is possible to accurately carry out the detection processing for detecting the position of the rotor of the brushless motor. Further, since the inverter control circuit and the drive circuit are formed integrally, a compact size and low cost inverter control circuit can be realized. Since the air conditioner, the refrigerator and the washing machine employ the above stated control apparatus, a compact size, low cost, making having a superior control characteristic can be realized.

According to the present invention, in the brushless motor, the magnetic pole position detection accuracy of the rotor is high and an accurate control can be attained.

Further, position detection error and electric supply error due to noises can be reduced, and, as a result, the control range can be enlarged.

Further, since the brushless motor is operation controlled with an efficiency importance characteristic, or the operation control is carried out with a high speed importance characteristic, the brushless motor can be controlled over a large range.

Further, by use of the brushless motor to be controlled by the above stated control apparatus as a driving source, an air conditioner having a high performance, a refrigerator having a high performance and a washing machine having the high performance can be realized.

To sum up, according to one of the features of the present invention, the phase signal generation circuit 9 is constituted using the comparison circuit 10, the delay circuit 11, the gate signal preparation circuit 13, and the selection signal holding circuit 12; and, the phase signal generated by this phase signal generation circuit 9 is pattern recognized by the control circuit 6, and the position of the rotor is detected. Therefore, PWM control for the whole area, PAM control, and the change-over of PWM/PAM control can be carried out.

What is claimed is:

1. Apparatus including a control apparatus for use in a brushless motor comprising: voltage detection means for generating a detection voltage in response to a terminal voltage of plural phases of a stator winding of the brushless motor, standard voltage generation means for generating a standard voltage, comparison means for outputting a comparison result information signal by comparing said detection voltage and said standard voltage, control means for detecting a rotation position of a rotor of the brushless motor according to said comparison result information signal which is outputted from said comparison means and for outputting an electric supply control signal, and output means for supplying electric power to said stator winding according to said electric supply control signal,
   wherein said control means detects a position of said rotor according to a pattern of plural phase comparison result information signals,
   wherein the brushless motor forms a part of at least one of a compressor and a blower of the apparatus which is one of (a) an air conditioner, (b) a refrigerator and (c) a washing machine, and
   wherein said control means controls so as to at least one of (a) extract an "on" period or an "off" period of a PWM (pulse width modulation) signal according to said comparison results information signal, (b) detect a position of said rotor according to a pattern of plural phase comparison result information signals, (c) determine a pattern of electric supply to said stator winding according to a pattern of plural phase comparison result information signals, (d) detect a period in which a return current flows after an electric supply changeover according to a pattern of said comparison result information signal, (e) detect a rotor position according to a pattern of said comparison result information signal and changes over an electric supply phase according to electric supply information which is stored in a memory, (f) detect a rotor position according to a pattern of said comparison result information signal and changes over an electric supply phase according to a phase control command from an outside source, and (g) carry out a phase control in an operation efficiency importance in a PWM control area and carries out control for proceeding an electric phase in a high rotation importance control area.

2. Apparatus according to claim 1, wherein said control means is constituted by one of a microprocessor having plural input and output ports and a hybrid IC having plural input and output ports.

3. Apparatus according to claim 1, wherein said control means outputs said electric supply control signal which is for said stator winding in response to said rotation position.

4. Apparatus according to claim 1, wherein said control means uses one of an A/D (analog/digital) conversion terminal, a communication use terminal and an input port as a terminal for inputting said phase control command from said outside source.

5. Apparatus according to claim 2, wherein said control means outputs said electric supply control signal which is for said stator winding in response to said rotation position.

6. Apparatus including a control apparatus for use in a brushless motor comprising: voltage detection means for generating a detection voltage in response to a terminal voltage of plural phases of a stator winding of the brushless motor, standard voltage generation means for generating a standard voltage, comparison means for outputting a comparison result information signal by comparing said detection voltage and said standard voltage, control means for detecting a rotation position of a rotor of the brushless motor according to said comparison result information signal which is outputted from said comparison means and for outputting an electric supply control signal, and output means for supplying electric power to said stator winding according to said electric supply control signal,     wherein said control means detects a position of said rotor according to a pattern of plural phase comparison result information signals, selection holding means for selecting whether said comparison result information signal from said comparison means is to be output from a phase signal or whether a previous level of said comparison result information signal is to be output as a phase signal,     wherein said selection holding means selects holding so as to at least one of operate to output, (a) when a PWM (pulse width modulation) signal is in an "on" condition, said comparison information signal from said comparison means as said phase signal as it is, and, (b) when said PWM signal changes to an "off" condition, continues to output the level of the condition comparison result information signal which occurred immediately before the "off" condition as said phase signal, and     wherein the brushless motor forms a part of at least one of a compressor and a blower of the apparatus which is one of (a) an air conditioner, (b) a refrigerator and (c) a washing machine.

7. Apparatus according to claim 6, wherein said control means is constituted by one of a microprocessor having plural input and output ports and a hybrid IC having plural input and output ports.

8. Apparatus according to claim 6, wherein said control means outputs said electric supply control signal which is for said stator winding in response to said rotation position.

9. Apparatus according to claim 6, further comprising a rectifying circuit for converting an alternating current power source voltage to a direct current voltage, an inverter circuit for converting said direct current voltage to an alternating current voltage and for supplying said alternating current voltage to said brushless motor, and a control circuit for controlling said inverter circuit.

10. Apparatus according to claim 6, further comprising a converter circuit having a rectifying circuit for converting an alternating current power source voltage to a direct current voltage and a chopper circuit for controlling the level of said direct current voltage, an inverter circuit for converting said direct current voltage which is received from said inverter circuit to an alternating current voltage and for supplying said alternating current voltage to said brushless motor, a converter control circuit for controlling a switching operation of said inverter circuit, an inverter control circuit for driving said brushless motor by controlling a switching operation of said inverter circuit, and a control circuit for controlling said converter control circuit and said inverter control circuit.

11. Apparatus including a control apparatus for use in a brushless motor comprising: voltage detection means for generating a detection voltage in response to a terminal voltage of plural phases of a stator winding of the brushless motor, standard voltage generation means for generating a standard voltage, comparison means for outputting a comparison result information signal by comparing said detection voltage and said standard voltage, control means for detecting a rotation position of a rotor of the brushless motor according to a pattern of a phase signal by obtaining said phase signal according to said comparison result information signal which is outputted from said comparison means and for outputting an electric supply control signal, and output means for supplying electric power to said stator winding according to said electric supply control signal,     wherein after a return current after an electric supply change-over vanishes, a processing is carried out for renewing a phase signal pattern which is correlated to carry out a position detection, and     wherein the brushless motor forms a part of at least one of a compressor and a blower of the apparatus which is one of (a) an air conditioner, (b) a refrigerator and (c) a washing machine.

12. Apparatus according to claim 11, wherein said control means is constituted by one of a microprocessor having plural input and output ports and a hybrid IC having plural input and output ports.

13. Apparatus according to claim 11, wherein said control means outputs said electric supply control signal which is for said stator winding in response to said rotation position.

14. In a brushless motor system having a brushless motor and a control apparatus for controlling the brushless motor, said control apparatus detects a rotor position of said brushless motor in response to the voltage of a stator winding of said brushless motor, wherein said control apparatus controls so as to at least one of (a) extract an "on" period or an "off" period of a PWM (pulse width modulation) signal only in accordance with a comparison result of a comparison between a terminal voltage of the stator winding and a standard voltage, and (b) detect the position of the rotor of said brushless motor in accordance with the extracted "on" period of the PWM signal or the extracted "off" period of the PWM signal.

* * * * *